United States Patent [19]
Shaw

[11] Patent Number: 5,425,103
[45] Date of Patent: Jun. 13, 1995

[54] VARIABLE-KEY CRYPTOGRAPHY SYSTEM

[76] Inventor: William Y. Shaw, 5449 Pacifica Dr., La Jolla, Calif. 92037

[21] Appl. No.: 209,918

[22] Filed: Mar. 14, 1994

[51] Int. Cl.⁶ .............................................. H04L 9/00
[52] U.S. Cl. ........................................ 380/44; 380/21
[58] Field of Search ..................... 380/44, 45, 46, 47, 380/21

[56] References Cited

U.S. PATENT DOCUMENTS

| | | | |
|---|---|---|---|
| 4,200,770 | 4/1980 | Hellmen et al. | 380/44 |
| 4,819,267 | 4/1989 | Cargile et al. | 380/23 |
| 4,897,876 | 1/1990 | Davies | 380/44 |
| 5,115,467 | 5/1992 | Esserman et al. | 380/44 |
| 5,241,599 | 8/1993 | Bellovin et al. | 380/44 |

*Primary Examiner*—David C. Cain
*Attorney, Agent, or Firm*—Brown, Martin, Haller & McClain

[57] ABSTRACT

Binary data is encrypted or decrypted using a final key. The final key is formed by manipulating one or more user keys and a base key, and combining the manipulated keys using an exclusive-OR operation. The data to be encrypted or decrypted are combined with the final key using a circular exclusive-OR operation. The user and base keys are binary sequences having any number of bits. The user key may be input to the present invention directly in binary form or in any other suitable form that the present invention can interpret as a binary sequence, such as a string of ASCII-encoded alphanumeric characters. Manipulating the user key includes the steps of shuffling or permuting segments of the user key, such as bytes, circularly shifting the permuted user key by a number of bit positions, and filling a location with one or more copies of the permuted and shifted key such that the result has a length equal to that of the base key. The ordering of the segments of the user key in the permutation step and the number of bit positions by which the user key is shifted in the shifting step are determined in response to the value and position of the segments of the user key itself. Manipulating the base key includes the step of circularly shifting the base key by a number of bit positions that is determined in response to the value and position of segments of the user key.

26 Claims, 2 Drawing Sheets

VARIABLE-KEY CRYPTOGRAPHY SYSTEM

BACKGROUND OF THE INVENTION

The present invention relates to cryptography and, more specifically, to a system for encrypting and decrypting digital data using one or more equally weighted variable-length keywords.

Cryptography may be used to provide secure communication or storage of digital data such as voice, facsimile (FAX), electronic mail, credit card information, and television. Practitioners in the art have developed encryption algorithms, such as the Data Encryption Standard (DES). These algorithms require a user to enter a keyword to either encrypt or decrypt the data. Data encrypted using a given keyword can only be decrypted by using the same keyword. DES requires that the keyword be exactly six alphanumeric characters in length. The essence of the DES algorithm is a complex decision tree that alters the states of data bits in response not only to the key but also to the results of logical operations that it performs on groups of data bits. Encryption or decryption is very slow because these calculations take a large amount of time and must be performed sequentially.

Analog cryptographic systems are used to provide secure video transmissions over microwave links and cable television lines. These systems must operate at high speeds to accommodate video bandwidths.

It would be desirable to provide a cryptographic system that does not restrict the user's choice of key length and that operates fast enough to be used in real-time video and voice environments. These problems and deficiencies are clearly felt in the art and are solved by the present invention in the manner described below.

SUMMARY OF THE INVENTION

The present invention comprises a method and apparatus for encrypting and decrypting digital data. The method comprises the steps of manipulating a user key and a base key, forming the exclusive-OR of the manipulated keys to produce a final key, and forming the exclusive-OR of the final key and the data to be encrypted or decrypted.

The user and base keys are binary sequence having any suitable number of bits. The maximum length of the keys is limited only by the physical capabilities of the software and/or hardware of the system in which the present invention is embodied. The base key may be stored in a manner that allows it to be retrieved, but need not be stored in a manner that allows it to be altered. Although the base key remains accessible, the user key is not retained in its original form after it is input. The user key may be input to the hardware employing the present invention, directly in binary form or in any other suitable form that the present invention can interpret as a binary sequence, such as an ASCII-encoded character string. ASCII-encoded strings consisting of a few characters or consisting of hundreds of pages of text may be suitable as user or base keys if the system hardware and/or software are adapted for manipulating such keys. Data may be encrypted or decrypted using multiple user keys to provide additional security, as described below.

The hardware employing the present invention may communicate data to be encrypted or decrypted with any suitable device, such as a computer system, a telephone network, or a wireless communication network.

Because manipulation of the keys to form the final key may be performed at any time before data communication occurs, the only step that must be performed in real-time, i.e, during data communication, is the exclusive-OR between the final key and the data. This minimization of real-time operations maximizes encryption and decryption speed.

Manipulating the user key comprises the steps of permuting the user key, circularly shifting the permuted user key, and filling a memory location with one or more copies of the permuted and shifted key such that the result has a length equal to that of the base key.

The permutation step shuffles segments of the key in a pseudorandom manner in response to the value and position of segments of the user key. The circular shifting step rotates or shifts the binary sequence by a number of bit positions that is determined in response to the value and position of segments of the permuted user key. In an illustrative embodiment that is adapted for manipulating user keys consisting of ASCII character strings, each segment may consist of one byte. The value of each such segment is thus the ASCII value of the character. The filling step may extend the length of the permuted and shifted user key to equal that of the base key if the base key is longer than the user key by copying the permuted and shifted user key into a location one or more times and appending the copies to each other.

Manipulating the base key comprises the step of circularly shifting the base key by a number of bit positions that is determined in response to the value and position of segments of the user key.

The manipulated user and base keys are combined using an exclusive-OR operation. The result may be further combined using an exclusive-OR operation with a number that is determined in response to the value and position of segments of the user key. The result of the latter exclusive-OR operation is the final key.

The present invention performs an exclusive-OR operation between the final key and the data to be encrypted or decrypted. If the data stream is longer than the final key, the final key may be recirculated.

If multiple user keys are used, each user key is permuted and combined with all other permuted user keys using an exclusive-OR operation. It should be noted that the order in which the user keys are input and combined is irrelevant due to the associative property of the exclusive-OR operation. If multiple user keys are used, the above-described step of circularly shifting the user key operates on the combined user key.

The present invention does not restrict the user's choice of key length. Furthermore, after performing the initial key manipulation, encryption and decryption speed is limited only by the speed at which the exclusive-OR operation can be performed. This operation can be performed by relatively simple hardware or software. The present invention also does not propagate any data errors that may occur. If one or more bits of the data to be encrypted or decrypted are in error, the exclusive-OR operation does not increase the number of such bits. Furthermore, unique systems can be created by providing unique base keys. Information encrypted from a system having a certain base key cannot be decrypted by a system having a different base key even if the user keys input to the two systems are identical.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF A PREFERRED EMBODIMENT

Figure 1:
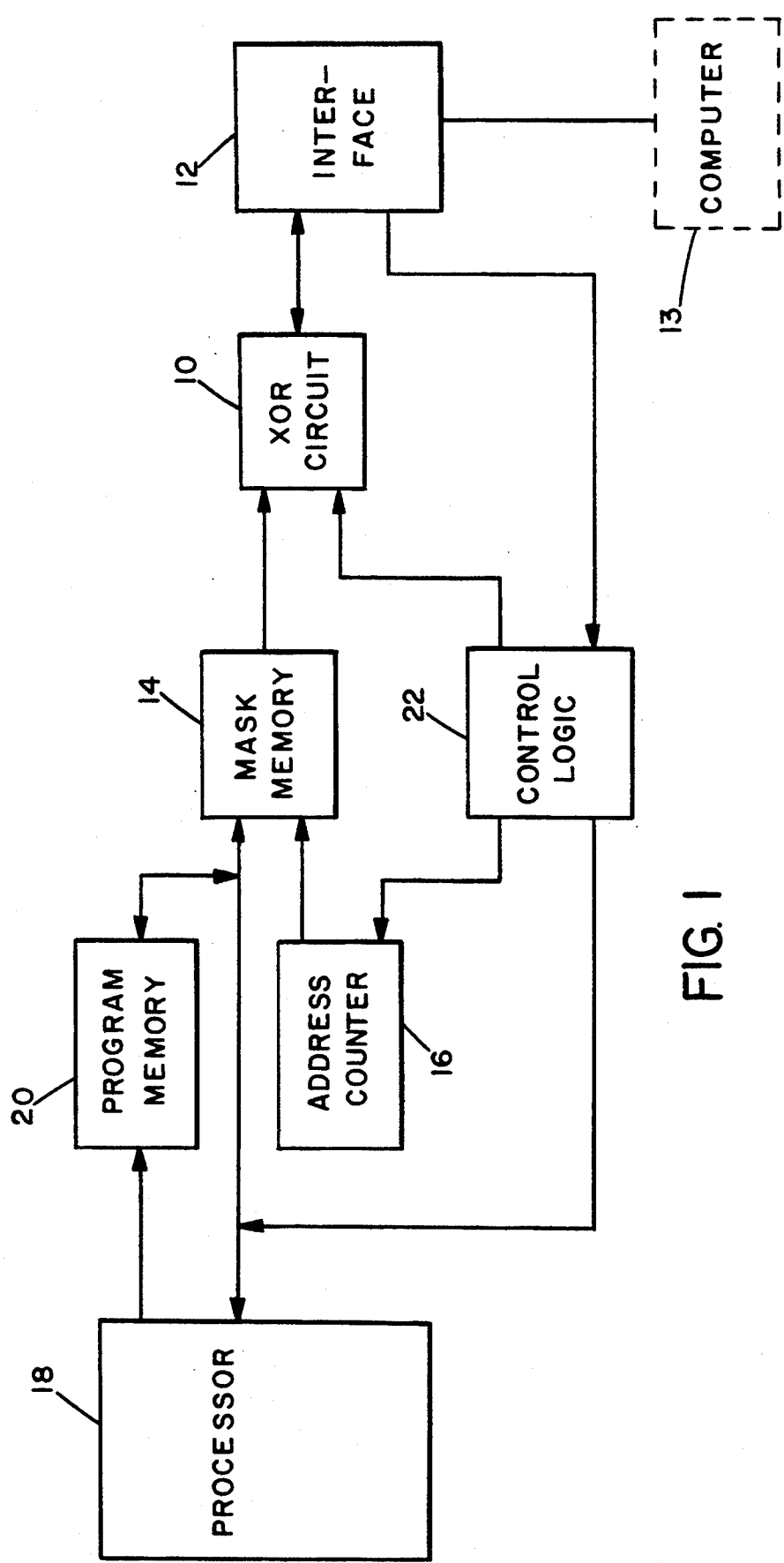
FIG. 1 is a block diagram of a circuit for encrypting and decrypting digital data.

As illustrated in FIG. 1, an exclusive-OR circuit 10 combines data to be encrypted or decrypted with a final key using an exclusive-OR operation. Circuit 10 receives the data from an interface circuit 12 that is connected to an external device 13, such as a computer. Circuit 10 receives the final key from a mask memory 14 that is addressed by an address counter 16. A processor 18, which has program memory 20, calculates the final key in the manner described below under control of a program stored in memory 20. Interface 12, circuit 10, address counter 16 and processor 18 are interconnected via control logic 22.

When it is desired to encrypt or decrypt data, processor 18 receives a user key via interface 12. For example, a user may enter the user key on a keyboard (not shown) connected to external device 13. Processor 18 combines the actual user key with a base key, which may be pre-stored in processor memory 20, in the manner described below under control of the program stored in memory 20. Processor 18 stores the final key in mask memory 14. When exclusive-OR circuit 10 receives data to be encrypted or decrypted via interface 12, address counter 16 is incremented to retrieve successive portions of the final key from mask memory 10. For example, if interface 10 is connected to a computer that reads and writes one byte at a time, address counter 16 may increment each time the computer performs a write operation to interface 12 in order to retrieve the next byte of the final key from memory 14. The computer can immediately perform a read operation to interface 12 to retrieve the encrypted or decrypted byte. Each byte of the final key is thus exclusive-OR'd with one byte of the incoming data. If the incoming data contains more bytes than the final key, this exclusive-OR process is repeated beginning at the first byte of the final key in a circular manner.

Figure 2:
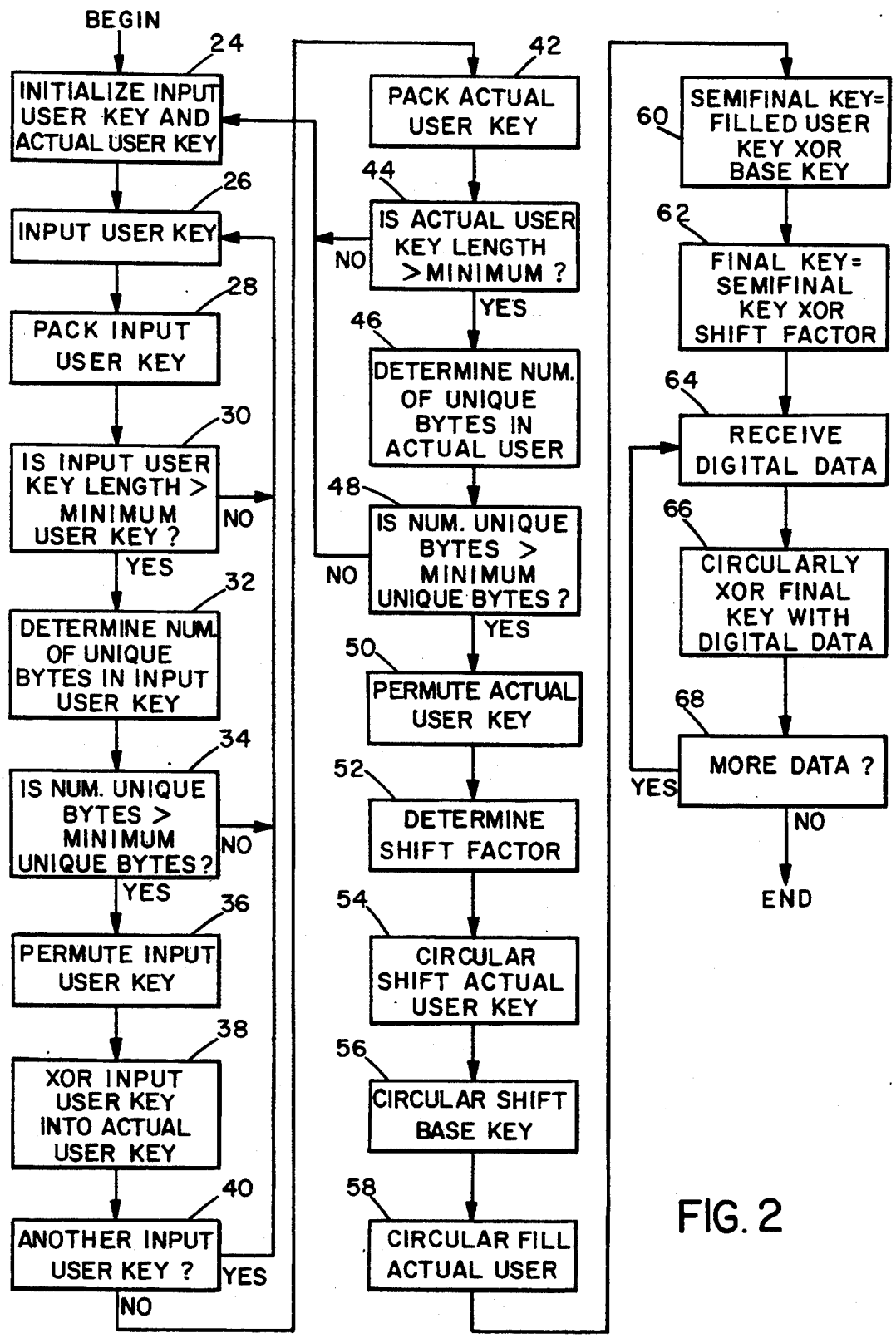
FIG. 2 is a flow diagram of an algorithm for encrypting and decrypting digital data.

Processor 18 performs the algorithm illustrated in FIG. 2 when a user desires to encrypt or decrypt data. At step 24 processor 18 initializes variables representing an input user key and an actual user key by setting them to zero. At step 26 processor 18 reads an input user key from the computer keyboard or other device connected via interface 12, as described above. The input user key is a digital word that may have any length greater than or equal to a predetermined minimum and less than a predetermined maximum. The maximum user key length is equal to the length of the base key, as discussed below. A user can more easily remember a key that is represented by a string of alphanumeric characters than, for example, a string of binary digits or hexadecimal digits. Therefore, in an illustrative embodiment, the key is represented by a string of ASCII-encoded characters. Each character is one byte, and processor 18 performs all mathematical operations on the basis of a wordlength of one byte. However, in other embodiments the user key can be received in any format that can ultimately be represented as a binary number, and mathematical operations may be performed on the basis of other suitable wordlengths.

For example, the minimum user key length may be five bytes, i.e., five characters. A user may thus enter the character string "IBAInc". These six characters can also be represented in ASCII by the string of hexadecimal numbers:

"49 42 41 49 6E 63".

At step 28 processor 18 packs the input user key. A user key having varying bits is preferred because such a user key provides more secure encryption. In the illustrated example, which uses a wordlength of one byte, processor 18 packs the input user key by removing any bytes having a value equal, in hexadecimal notation, equal to "00" or "FF". The remaining bytes are moved in a direction from the less significant bytes toward the more significant bytes (leftward in the drawing) to close up the space previously occupied by the bytes that were removed.

At step 30 processor 18 tests whether the packed input user key has a length greater than the predetermined minimum. For example, the packing step would not alter the input user key "IBAInc" and the length remains six, which is greater than the predetermined minimum of five. Processor 18 therefore proceeds to step 32. However, if processor 18 determines that the packed user key has a length less than the minimum, processor 18 returns to step 26, which requires that the user re-enter the input user key.

At step 32 processor 18 determines the number of unique bytes in the packed input user key. A unique byte is a byte that is different from every other byte. The number of unique bytes in the packed key "IBAInc" is five because the byte representing the character "I" appears twice. At step 34 processor 18 tests whether the number of unique bytes is greater than a predetermined minimum. For example, the minimum may be five, and processor 18 therefore proceeds to step 36. However, if processor 18 determines that the number of unique bytes in the packed input user key is less than the minimum, processor 18 returns to step 26, which requires that the user re-enter the input user key.

At step 36 processor 18 permutes the packed input user key. Permuting the user key shuffles the bytes in a pseudorandom manner in response to the value and positional weight of the bytes. Each byte may be swapped with another byte. The permutation step can be expressed as follows, where the packed input user key is represented by the variable KEY, the ith byte of KEY is represented by $KEY_i$, and N is the length of KEY in bytes:

$L = ((KEY_{i-1} + KEY_i + KEY_{i+1} + i) \text{ modulo } N) + 1.$

For $i = 2, 3, 4, \ldots N-1$, swap $KEY_i$ with $KEY_L$.

For example, to permute the input user key "IBAInc" processor 18 performs four swaps: First, when i equals 2, L equals 3, which is 206 modulo 6, plus 1. Processor 18 swaps the second and third bytes of "IBAInc" yielding "IABInc". The number 206 is the sum of $KEY_1$, which is represented by the decimal number 73, $KEY_2$, which is represented by the decimal number 66, $KEY_3$, which is represented by the decimal number 65, and i, which is two. Second, when i equals 3, L equals 4, which is 207 modulo 6, plus 1. Processor 18 swaps the third and fourth bytes of "IABInc" yielding "IAIBnc". The number 207 is the sum of $KEY_2$, which is represented by the decimal number 65, $KEY_3$, which is represented by the decimal number 66, $KEY_4$, which is represented by the decimal number 73, and i, which is three. Third, when i equals 4, L equals 2, which is 253 modulo 6, plus 1. Processor 18 swaps the fourth and second bytes of "IAIBnc" yielding "IBIAnc". The number 253 is the sum of $KEY_3$, which is represented by the decimal number 73, $KEY_4$, which is represented by the decimal number 66, $KEY_5$, which is represented by the decimal number 110, and i, which is four. Fourth, when i equals 5, L equals 4, which is 279 modulo 6, plus 1. Processor 18 swaps the fifth and fourth bytes of "IBIAnc" yielding "IBInAc". The number 279 is the sum of $KEY_4$, which is represented by the decimal number 65, $KEY_5$, which is represented by the decimal number 110, $KEY_6$, which is represented by the decimal number 99, and i, which is five.

At step 38 processor 18 exclusive-ORs the packed and permuted input user key into the actual user key. An actual user key may comprise multiple input user keys that are combined using an exclusive-OR operation. For example, the actual user key was set to zero at step 24, and after exclusive-ORing the actual user key with the packed and permuted input user key "IBInAc" the actual user key becomes "IBInAc".

At step 40 processor 38 tests whether another user key is to be input. Processor 38 may receive a suitable command via interface 12 to indicate this. If processor 18 receives an indication that another user key is to be input, processor 18 proceeds to step 26 to receive the next input user key. If processor 38 receives an indication that no additional user keys are to be input, processor 18 proceeds to step 40. In the present example, "IBAInc" is the sole user key. Therefore, "IBInAc" is the actual user key.

At step 42 processor 18 packs the actual user key in the same manner as that described above with respect to step 28. At step 44 processor 18 tests whether the packed actual user key has a length greater than a predetermined minimum, which preferably has the same value as the predetermined minimum described above with respect to step 30. For example, the packing step would not alter the actual user key "IBInAc" and the length remains six, which is greater than the predetermined minimum of five. Processor 18 therefore proceeds to step 46. However, if processor 18 determines that the packed user key has a length less than the minimum, processor 18 returns to step 24, which requires that the user re-enter all input user keys.

At step 46 processor 18 determines the number of unique bytes in the packed actual user key in the same manner as that described above with respect to step 32 and, at step 48, tests whether the number of unique bytes is greater than a predetermined minimum, which is preferably the same minimum as that described above with respect to step 34. For example, since no additional input user keys are combined with the initial input user key "IBAInc" the number of unique bytes remains five. Processor 18 therefore proceeds to step 50. However, if processor 18 determines that the number of unique bytes in the packed actual user key is less than the minimum, processor 18 returns to step 24, which requires that the user re-enter all input user keys.

At step 50 processor 18 permutes the packed actual user key in the same manner as that described above with respect to step 36. For example, to permute the actual user key "IBInAc" processor 18 performs four swaps: First, when i equals 2, L equals 5, which is 214 modulo 6, plus 1. Processor 18 swaps the second and fifth bytes of "IBInAc", yielding "IAInBc". The number 214 is the sum of $KEY_1$, which is represented by the decimal number 73, $KEY_2$, which is represented by the decimal number 66, $KEY_3$, which is represented by the decimal number 73, and i, which is two. Second, when i equals 3, L equals 6, which is 251 modulo 6, plus 1. Processor 18 swaps the third and sixth bytes of "IAInBc", yielding "IAcnBI". The number 251 is the sum of $KEY_2$, which is represented by the decimal number 65, $KEY_3$, which is represented by the decimal number 73, $KEY_4$, which is represented by the decimal number 110, and i, which is three. Third, when i equals 4, L equals 4, which is 279 modulo 6, plus 1. Processor 18 swaps the fourth byte of "IAIBnc" with itself, yielding "IAIBnc". The number 279 is the sum of $KEY_3$, which is represented by the decimal number 99, $KEY_4$, which is represented by the decimal number 110, $KEY_5$, which is represented by the decimal number 66, and i, which is four. Fourth, when i equals 5, L equals 3, which is 254 modulo 6, plus 1. Processor 18 swaps the fifth and third bytes of "IAIBnc" yielding "IABncI". The number 254 is the sum of $KEY_4$, which is represented by the decimal number 110, $KEY_5$, which is represented by the decimal number 66, $KEY_6$, which is represented by the decimal number 73, and i, which is five.

At step 52 processor 18 determines a shift factor in response to the value and positional weight of the bytes. The shift factor, S, can be expressed as follows, where the permuted actual user key is represented by the variable KEY, the ith byte of KEY is represented by $KEY_i$, and N is the length of KEY in bytes:

Let S=0 initially.

For i=1,2,3, ... N, increment S by $(255+i)*KEY_i$.

For example, if the permuted actual user key is "IABncI", processor 18 sums the value 18688, which is $(255+1)*73$, the value 16705, which is $(255+2)*65$, the value 17028, which is $(255+3)*66$, the value 17028, which is $(255+3)*66$, the value 28490, which is $(255+4)*110$, the value 25740, which is $(255+5)*99$, and the value 19053, which is $(255+6)*73$. The sum is equal to 125704, which is the shift factor S.

At step 54 processor 18 circularly shifts the bits of the permuted actual user key in a direction from the less significant bits toward the more significant bits (leftward in the drawing). (The shift is circular because a bit occupying the most significant position is shifted to the least significant position.) The number of places by which the permuted actual user key is shifted is equal to the shift factor modulo the length of the permuted actual user key expressed in units of bits, plus one. For example, a shift factor of 125704 modulo 48, which is the number of bits in "IABncI", plus one, equals 41. The 41st bit thus becomes the first or most significant bit. Before shifting, the permuted actual user key "IABncI" can be expressed in binary as:

"0100 1001 0100 0001 0100 0010 0110 1110 0110 0111 0100 1001", where the 41st bit is underlined for emphasis. Shifted 41 places to the left, the key becomes:

"0100 1001 0100 1001 0100 0001 0100 0010 0110 1110

```
0110 0111".
```

At step 56 processor 18 circularly shifts the bits of the base key in a direction from the less significant bits toward the more significant bits (leftward in the drawing). The number of places by which the base key is shifted is equal to the shift factor S modulo the length of the base key expressed in units of bits, plus one.

The base key is a digital word of any suitable length. It is preferred that the base key be accessible by processor 18 but not readable or changeable by a user. The base key is preferably used in a manner similar to a serial number and thus set to a fixed value. It may be hardwired into the system as a software or firmware constant. As described above with respect to the user key, the base key need not be encoded using ASCII or any other encoding scheme, but may be so encoded for convenience. It may be convenient to use an alphanumeric character string that has been ASCII-encoded as a base key if, for example, it is desired for users or other personnel to change the base key from time to time.

A base key could, for example, be expressed by the ASCII-encoded character string "ImportantInformation". The length of this base key is 20 bytes or 160 bits. Although this base key is sufficient for illustrative purposes, a base key having a length of at least 256 bytes is preferred. A shift factor of 125704 modulo 160, plus one, equals 105. The 105th bit thus becomes the first or most significant bit. Before shifting, the base key "ImportantInformation" can be expressed in hexadecimal as:

```
"49 6D 70 6F 72 74 61 6E 74 49 6E 66 6F 72 6D 61 74
69 6F 6E"
``` or in binary as:

```
"0100 1001 0110 1101 0111 0000 0110 1111 0111 0010 0111
0100 0110 0001 0110 1110 0111 0100 0100 1001 0110 1110
0110 0110 0110 1111 0111 0010 0110 1101 0110 0001 0111
0100 0110 1001 0110 1111 0110 1110",
``` where the 105th bit is underlined for emphasis. Shifted 105 places to the left, the key becomes:

```
"0111 0010 0110 1101 0110 0001 0111 0100 0110 1001 0110
1111 0110 1110 0100 1001 0110 1101 0111 0000 0110 1111
0111 0010 0111 0100 0110 0001 0110 1110 0111 0100 0100
1001 0110 1110 0110 0110 0110 1111".
```

At step 58 processor 18 circularly fills the permuted and shifted actual user key. This filling step extends the length of the actual user key to equal that of the base key if the base key is longer than the actual user key. (The filling is circular because, if the base key is longer than the user key, the user key is duplicated and the copies are appended to one another.) If the length of the base key is not an even multiple of the length of the user key, the less significant bits of the user key may be truncated. For example, if the base key has a length of 160 bits, a user key having a length of 48 bits must be duplicated three times. The three copies and the original are appended together and the result is truncated to 160 bits. Using the permuted and shifted actual user key from the example above, the filled user key becomes:

```
"0100 1001 0100 1001 0100 0001 0100 0010 0110 1110 0110
0111 0100 1001 0100 1001 0100 0001 0100 0010 0110 1110
0110 0111 0100 1001 0100 1001 0100 0001 0100 0010 0110
1110 0110 0111 0100 1001 0100 1001".
```

At step 60 processor 18 forms the exclusive-OR of this key and the shifted base key. Using the keys from the example above, the results of the exclusive-OR operation ($\oplus$) are:

```
  "0100 1001 0100 1001 0100 0001 0100 0010 0110 1110 0110
⊕ "0100 1001 0110 1101 0111 0000 0110 1111 0111 0010 0111
   0000 0000 0010 0100 0011 0001 0010 1101 0001 1100 0001
   0111 0100 1001 0100 1001 0100 0001 0100 0010 0110 1110
⊕  0100 0110 0001 0110 1110 0111 0100 0100 1001 0110 1110
   0011 0010 1000 0010 0111 0011 0101 0000 1011 0000 0000
   0110 0111 0100 1001 0100 1001 0100 0001 0100 0010 0110
⊕  0110 0110 0110 1111 0111 0010 0110 1101 0110 0001 0111
   0000 0001 0010 0110 0011 1011 0010 1100 0010 0011 0001
   1110 0110 0111 0100 1001 0100 1001" (user key)
⊕  0100 0110 1001 0110 1111 0110 1110" (base key)
   1010 0000 1110 0010 0110 0010 0111 (resulting key)
```

The resulting key, however, is preferably not the final key that is used to encrypt or decrypt data. Rather, an additional randomization may be performed at step 62. At step 62 processor 18 forms the final key by combining this semifinal key with the shift factor S that was calculated above at step 52. To combine the semifinal key with the shift factor S, processor 18 calculates the circular exclusive-OR of the shift factor S, expressed as a four byte word, and the semifinal key. (The exclusive-OR operation is circular because, if the length of the shift factor is less than that of the semifinal key, the shift factor is duplicated and the copies are appended to one another to extend the length of the shift factor to equal that of the semifinal key.) The shift factor from the above example, 125704, can be expressed in binary as:
"0000 0000 0000 0001 1110 1011 0000 10000".

The result of the exclusive-OR operation ($\oplus$) between this shift factor, circularly extended to 160 bits, and the semifinal key is:

```
  "0000 0000 0010 0100 0011 0001 0010 1101 0001 1100 0001
⊕ "0000 0000 0000 0001 1110 1011 0000 1000 0000 0000 0000
   0000 0000 0010 0101 1101 1010 0010 0101 0001 1100 0001
   0011 0010 1000 0010 0111 0011 0101 0000 1011 0000 0000
⊕  0001 1110 1011 0000 1000 0000 0000 0000 0001 1110 1011
   0010 1100 0010 0010 1111 0011 0101 0000 1010 1110 1011
   0000 0001 0010 0110 0011 1011 0010 1100 0010 0011 0001
⊕  0000 1000 0000 0000 0000 0001 1110 1011 0000 1000 0000
   0000 1001 0010 0110 0011 1010 1100 1111 0010 1011 0001
   1010 0000 1110 0010 0110 0010 0111" (semifinal key)
⊕  0000 0000 0001 1110 1011 0000 1000" (shift factor)
   1010 0000 1111 1100 1101 0010 1111 (final key)
```

Key manipulation is essentially complete after processor 18 performs step 62. However, processor 18 may mask one or more bits of each byte of the final key if the data to be encrypted or decrypted is more conveniently expressed in words having a length less than one byte. Processor 18 loads the final key into mask memory 14.

At step 64 exclusive-OR circuit 10 receives a byte of data to be encrypted or decrypted from the external device 13 via interface 12. Control logic 22 receives an indication that the data byte has been transferred. If the external device 13 to which interface 12 is connected is a computer, this indication may be the activation of the WRITE line of the computer. The first byte of the final key appears at the output of mask memory 14 in response to the address present at the output of address counter 16. At step 66 exclusive-OR circuit 10 performs an exclusive-OR operation on the data byte and the byte of the final key that appears at the output of mask memory 14. External device 13 may receive the result of this operation, which is the encrypted or decrypted data byte, via interface 12. If the external device 13 to which interface 12 is connected is a computer, address counter 16 may increment its address in response to the activation of the READ line of the computer. If processor 18 receives an indication at step 68 via interface 12 that no more data bytes are to be encrypted or decrypted, the process ends and processor 18 awaits an indication that will cause it to begin processing again at step 24. If processor 18 receives no such indication, exclusive-OR circuit 10 waits to receive another data byte to be encrypted or decrypted at step 64. The exclusive-OR operation is circular because address counter 16 returns to the address of the first byte of the final key in mask memory 14 immediately after the address of the last byte of the final key.

The data to be encrypted could, for example, be expressed by the ASCII-encoded string "Secret Message". This data can be expressed in hexadecimal as:
"53 65 63 72 65 74 20 4D 65 73 73 61 67 65"
or in binary as:

```
"0101 0011 0110 0101 0110 0011 0111 0010 0110 0101
 0111 0100 0010 0000 0100 1101 0110 0101 0111 0011
 0111 0011 0110 0001 0110 0111 0110 0101".
```

At step 66 processor 18 forms the circular exclusive-OR of this data and the final key. Using the final key form the example above, the results of this exclusive-OR operation (⊕) are:

```
  "0101 0011 0110 0101 0110 0011 0111 0010 0110 0101 0111
⊕  0000 0000 0010 0101 1101 1010 0010 0101 0001 1100 0001
   0101 0011 0100 0000 1011 1001 0101 0111 0111 1001 0110
   0100 0010 0000 0100 1101 0110 0101 0111 0011 0111 0011
⊕  0010 1100 0011 0010 1111 0011 0101 0000 1010 1110 1011
   0110 1110 0011 0110 0010 0011 0111 1001 1001 1000
   0110 0001 0110 0111 0110 0101" (data)
⊕  1010 0000 1111 1100 1101 0010" (final key)
   1100 0001 1001 1011 1011 0111 (encrypted data)
```

Although the exclusive-OR is circular, the final key is not duplicated in this example because the length of the data to be encrypted is less than that of the final key. The encrypted data can be expressed in hexadecimal as:
"52 40 B9 57 79 66 E3 62 50 79 98 C1 9B B7"
or as the ASCII-encoded character string:
"R@9WyfSbPy<CAN>A<ESC>7".

The encrypted character string not only bears no resemblance to the original string "Secret Message", but the encrypted data differs greatly from the original data even when the two strings are expressed in binary or other notations. More importantly, if the user key or base key used in the above-described example were to be changed even by as little as a single bit, the encrypted data would differ greatly from the encrypted data shown above. Conversely, if a user key closely resembling the user key "IBAInc" but differing by as little as a single bit were used to decrypt this string, the decrypted data would not resemble the original data, regardless of whether the data are compared as strings of ASCII characters or bits.

Although the hardware and software described above with respect to FIGS. 1 and 2 may be particularly suitable for encrypting and decrypting text strings received from a computer, it should be noted that the data to be encrypted or decrypted can be any digital data. The data need not be expressible as a text string and could, for example, represent a digital voice, facsimile (FAX), still image, or television signal.

In summary, processor 18 manipulates one or more input user keys and a base key to form a final key, which is used to encrypt or decrypt data. Processor 18 manipulates the input user keys to form an actual user key at steps 24-40 and performs further manipulation on the actual user key at steps 42-54 and 58. Processor 18 manipulates the base key at step 56, and combines the manipulated base and user keys at step 60 to form a semifinal key. Processor 18 may then combine the semifinal key with a value derived from the actual user key, such as the shift factor, to form a final key at step 62. At steps 64-68 the final key is combined with data to be encrypted or decrypted. It should be noted that the above-described method can be used for either encryption or decryption. Processor 18 may be used only for manipulating the keys and need not differentiate between encryption and decryption.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

I claim:

1. A method for encrypting and decrypting digital data, comprising the steps of:
   forming an actual user key, said step of forming an actual user key comprising the steps of:
   receiving an input user key comprising a sequence of bits;
   permuting said input user key to form a permuted user key;
   circularly shifting said permuted user key to form a shifted user key; and
   filling a location having a length equal to the length of said base key with said shifted user key to form said actual user key;
   forming an actual base key, said step of forming an actual base key comprising the step of:
   circularly shifting a predetermined base key comprising a sequence of bits;
   forming a final key, said step of forming a final key comprising the step of:
   calculating the exclusive-OR of said actual base key and said actual user key; and
   calculating the exclusive-OR of said final key and said digital data.

2. The method recited in claim 1, wherein said step of permuting said input user key comprises the steps of:
   selecting two selected portions of said input user key, each said selected portion comprising a sequence of bits, each said selected portion determined in response to the value and position within said input user key of each of a plurality of predetermined portions of said input user key; and swapping said selected portions of said input user key.

3. The method recited in claim 2, wherein each said portion consists of a byte.

4. The method recited in claim 3, wherein said predetermined portions consist of a plurality of consecutive bytes of said input user key.

5. The method recited in claim 4, wherein said predetermined portions consist of three consecutive bytes of said input user key.

6. The method recited in claim 5, wherein:

said step of selecting two selected portions of said input user key comprises the steps of:

selecting a byte $KEY_i$ of said input user key having an index number equal to i;

selecting a byte $KEY_L$ of said input user key having an index number equal to L; and said step of permuting said input user key comprises repeating said steps of selecting a byte for values of i between 2 and N−1 inclusive, wherein each byte of said input user key has an index number, wherein N is the length of said input user key in bytes, and wherein:

$L = ((KEY_{i-1} + KEY_i + KEY_{i+1} + i) \text{ modulo } N) + 1$.

7. The method recited in claim 1, wherein said step of circularly shifting said permuted user key comprises the step of:

circularly shifting said permuted user key by a number of bit positions, said number determined in response to the value and positional weight of each of a plurality of portions of said permuted user key, each said portion comprising a sequence of bits.

8. The method recited in claim 7, wherein each said portion consists of a byte.

9. The method recited in claim 8, wherein said portions consist of all bytes of said permuted user key.

10. The method recited in claim 9, wherein said step of circularly shifting said permuted user key by a number of bit positions comprises the steps of:

forming a shift factor S equal to the sum of the values $(255+i) * KEY_i$ for values of i between 1 and N inclusive, wherein KEY is a byte of said user key, wherein each said byte of said user key has an index number, wherein N is the length of said user key in bytes; and circularly shifting said permuted user key by L bit positions toward the most significant bit position, wherein:

$L = (S \text{ modulo } (N*8)) + 1$.

11. The method recited in claim 1, wherein said step of circularly shifting a predetermined base key comprises the step of:

circularly shifting said predetermined base key by a number of bit positions; and said number of bit positions is determined in response to the value and positional weight of each of a plurality of portions of said permuted user key, each said portion comprising a sequence of bits.

12. The method recited in claim 11, wherein each said portion consists of a byte.

13. The method recited in claim 12, wherein said portions consist of all bytes of said permuted user key.

14. The method recited in claim 13, wherein said step of circularly shifting said predetermined base key by a number of bit positions comprises the steps of:

forming a shift factor S equal to the sum of the values $(255+i) * KEY_i$ for values of i between 1 and N inclusive, wherein KEY is a byte of said user key, wherein each said byte of said user key has an index number, wherein N is the length of said user key in bytes; and circularly shifting said predetermined base key by L bit positions toward the most significant bit position;

wherein M is the length of said base key in bytes, and wherein:

$L = (S \text{ modulo } (M*8)) + 1$.

15. The method recited in claim 1, wherein said step of forming a final key comprises the steps of:

forming a shift factor S equal to the sum of the values $(255+i) * KEY_i$ for values of i between 1 and N inclusive, wherein KEY is a byte of said user key, wherein each said byte of said user key has an index number, wherein N is the length of said user key in bytes;

calculating the exclusive-OR of said shifted base key and said filled user key to form a semifinal key; and calculating the exclusive-OR of said semifinal key and said shift factor S, wherein said shift factor S is represented as a four byte word.

16. The method recited in claim 1, wherein said step of receiving an input user key comprises the steps of:

reading said input user key from an input device;

packing said input user key;

determining the number of unique bytes in said packed input user key; and rejecting said input user key if said packed input user key has a number of bytes less than a predetermined minimum number of total user key bytes or if said packed input user key has a number of unique bytes less than a predetermined minimum number of unique user key bytes.

17. The method recited in claim 16, wherein said step of packing said user key comprises the step of deleting all bytes consisting of all ones ("1") and all bytes consisting of all zeros ("0").

18. The method recited in claim 1, wherein said step of forming an actual user key comprises the steps of:

receiving at least one input user key from an input device, each comprising a sequence of bits;

permuting each said input user key to form a permuted user key;

calculating the exclusive-OR of each said permuted user key with every other said permuted user key to form a total user key;

permuting said total user key; and circularly shifting said total user key.

19. The method recited in claim 18, wherein said step of forming an actual user key further comprises, before said step of permuting said total user key, the steps of:

packing said total user key to form a packed total user key;

determining the number of unique bytes in said packed total user key; and rejecting all said input user keys if said packed total user key has a length less than a predetermined minimum total user key length or if said packed total user key has a number of unique bytes less than a predetermined minimum number of unique bytes.

20. A method for encrypting and decrypting digital data, comprising the steps of:

forming an actual user key, said step of forming an actual user key comprising the steps of:

receiving an input user key comprising a sequence of bits;

selecting two selected portions of said input user key, each said selected portion comprising a sequence of bits, each said selected portion determined in response to the value and position of each of a plurality of predetermined portions of said user key;

swapping said selected portions of said input user key to form a permuted user key; and circularly shifting said permuted user key by a number of bit positions to form a shifted user key, said number determined in response to the value and positional weight of each of a plurality of portions of said permuted user key, each said portion comprising a sequence of bits; and filling a location having a length equal to the length of said base key with said shifted user key to form said actual user key;

forming an actual base key, said step of forming an actual base key comprising the step of:

circularly shifting said predetermined base key by a number of bit positions, said number of bit positions determined in response to the value and positional weight of each of a plurality of portions of said permuted user key, each said portion comprising a sequence of bits;

forming a final key, said step of forming a final key comprising the step of:

calculating the exclusive-OR of said actual base key and said actual user key; and calculating the exclusive-OR of said final key and said digital data.

21. The method recited in claim 20, wherein:

said step of selecting two selected portions of said user key comprises the steps of:

selecting a byte $KEY_i$ of said user key having an index number equal to i;

selecting a byte $KEY_L$ of said user key having an index number equal to L; and said step of forming an actual user key comprises repeating said steps of selecting a byte of said user key for values of i between 2 and N−1 inclusive, wherein each byte of said user key has an index number, wherein N is the length of said user key in bytes, and wherein:

$L = ((KEY_{i-1} + KEY_i + KEY_{i+1} + i) \text{ modulo } N) + 1$.

22. The method recited in claim 20, wherein said step of circularly shifting said permuted user key by a number of bit positions comprises the steps of:

forming a shift factor S equal to the sum of the values $(255+i)*KEY_i$ for values of i between 1 and N inclusive, wherein KEY is a byte of said user key, wherein each said byte of said user key has an index number, wherein N is the length of said user key in bytes; and circularly shifting said permuted user key by L bit positions toward the most significant bit position, wherein:

$L = (S \text{ modulo } (N*8)) + 1$.

23. The method recited in claim 20, wherein said step of circularly shifting said predetermined base key by a number of bit positions comprises the steps of:

forming a shift factor S equal to the sum of the values $(255+i)*KEY_i$ for values of i between 1 and N inclusive, wherein KEY is a byte of said user key, wherein each said byte of said user key has an index number, wherein N is the length of said user key in bytes; and circularly shifting said predetermined base key by L bit positions toward the most significant bit position;

wherein M is the length of said base key in bytes, and wherein:

$L = (S \text{ modulo } (M*8)) + 1$.

24. The method recited in claim 20, wherein said step of forming a final key comprises the steps of:

forming a shift factor S equal to the sum of the values $(255+i)*KEY_i$ for values of i between 1 and N inclusive, wherein KEY is a byte of said user key, wherein each said byte of said user key has an index number, wherein N is the length of said user key in bytes;

calculating the exclusive-OR of said shifted base key and said filled user key to form a semifinal key; and calculating the exclusive-OR of said semifinal key and said shift factor S, wherein said shift factor S is represented as a four byte word.

25. An apparatus for encrypting and decrypting digital data, comprising:

interface means for bidirectionally communicating digital data;

processor means for computing a final key in response to a predetermined user key and a predetermined base key;

memory means for storing said final key;

exclusive-OR means for receiving said final key and said digital data and for providing the exclusive-OR of said digital data and said final key to said interface; and addressing means for sequentially providing addresses to said memory means, said addresses corresponding to successive portions of said final key.

26. The apparatus recited in claim 25, wherein each of said successive portions is a byte.

* * * * *